United States Patent
Harjeet et al.

(10) Patent No.: US 9,081,407 B2
(45) Date of Patent: Jul. 14, 2015

(54) VOLTAGE REGULATION SYSTEM AND METHOD

(71) Applicant: General Electric Company, Schenectady, NY (US)

(72) Inventors: Johal Harjeet, Glenville, NY (US); Naresh Acharya, Niskayuna, NY (US); Kathleen Ann O'Brien, Niskayuna, NY (US); Xinhui Wu, Shanghai (CN)

(73) Assignee: General Electric Company, Niskayuna, NY (US)

( * ) Notice: Subject to any disclaimer, the term of this patent is extended or adjusted under 35 U.S.C. 154(b) by 390 days.

(21) Appl. No.: 13/723,585

(22) Filed: Dec. 21, 2012

(65) Prior Publication Data

US 2014/0176090 A1    Jun. 26, 2014

(51) Int. Cl.
  *G05F 1/70* (2006.01)
  *H02J 3/12* (2006.01)
  *H02J 3/38* (2006.01)

(52) U.S. Cl.
  CPC ... *G05F 1/70* (2013.01); *H02J 3/12* (2013.01); *H02J 3/381* (2013.01)

(58) Field of Classification Search
  CPC . G05F 1/70; H02M 1/4208; H02M 2001/008; H02M 2001/0012
  USPC ................................. 323/205, 209
  See application file for complete search history.

(56) References Cited

U.S. PATENT DOCUMENTS

| | | | |
|---|---|---|---|
| 6,411,066 B1 * | 6/2002 | Jiang-Hafner | 323/207 |
| 7,719,140 B2 | 5/2010 | Ledenev et al. | |
| 2010/0156188 A1 | 6/2010 | Fishman | |
| 2010/0237834 A1 * | 9/2010 | Alonso Sadaba et al. | 323/205 |
| 2011/0298442 A1 | 12/2011 | Waltisperger et al. | |
| 2012/0133209 A1 | 5/2012 | O'Brien et al. | |
| 2013/0134789 A1 * | 5/2013 | Panosyan et al. | 307/84 |
| 2015/0035377 A1 * | 2/2015 | James et al. | 307/104 |

FOREIGN PATENT DOCUMENTS

| | | |
|---|---|---|
| GB | 2410386 A | 7/2005 |
| JP | 2001051734 A | 2/2001 |
| JP | 2005269744 A | 9/2005 |
| JP | 2009065788 A | 3/2009 |
| JP | 2009071889 A | 4/2009 |

OTHER PUBLICATIONS

E. Liu et al., "Distribution System Voltage Performance Analysis for High-Penetration Photovoltaics", NREL—National Renewable Energy Laboratory, pp. 1-46, Feb. 2008.

(Continued)

*Primary Examiner* — Adolf Berhane
*Assistant Examiner* — Yemane Mehari
(74) *Attorney, Agent, or Firm* — Nitin N. Joshi

(57) ABSTRACT

A method for regulating a power line voltage includes determining a slow voltage variation by filtering an actual voltage at terminals of the voltage regulation apparatus. A fast active power variation is determined by filtering a measured active power of the DG system; wherein a first frequency of the slow voltage variation is smaller than a second frequency of the fast active power variation. The voltage regulation apparatus settings are controlled based on the slow voltage variation and a reactive power output of the DG system is controlled based on fast active power variation.

21 Claims, 6 Drawing Sheets

(56) References Cited

OTHER PUBLICATIONS

L.F. Casey et al., "Advanced Inverters Facilitate High Penetration of Renewable Generation on Medium Voltage Feeders—Impact and Benefits for the Utility", 2010 IEEE Conference on Innovative Technologies for an Efficient and Reliable Electricity Supply (CITRES), pp. 86-93, Sep. 29, 2010.

M. Scharf et al., "Laying the Foundation for the Grid-Tied Smart Inverter of the Future", PV Powered, pp. 1-12, 2010.

K. Turitsyn et al., "Options for Control of Reactive Power by Distributed Photovoltaic Generators", Proceedings of the IEEE, pp. 1063-1073, vol. 99, Issue 6, Jun. 2011.

M. Farivar et al., Optimal Inverter VAR Control in Distribution Systems with High PV Penetration, pp. 1-7, Dec. 23, 2011.

B. Mather et al., "High-Penetration PV Integration Distribution System Modeling Challenges", NREL—National Renewable Energy Laboratory, pp. 1-15, Apr. 19, 2012.

PCT Search Report and Written Opinion dated Mar. 31, 2014 issued in connection with corresponding PCT Application No. PCT/US2013/071558.

* cited by examiner

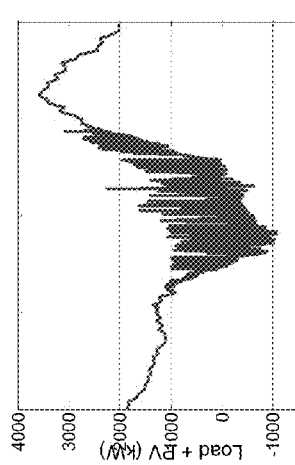
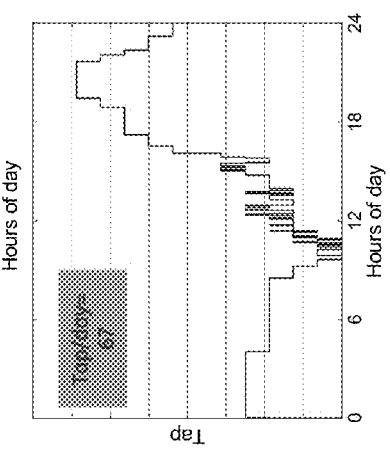
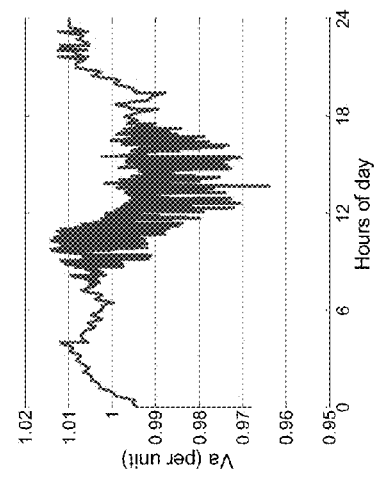
Fig. 6A
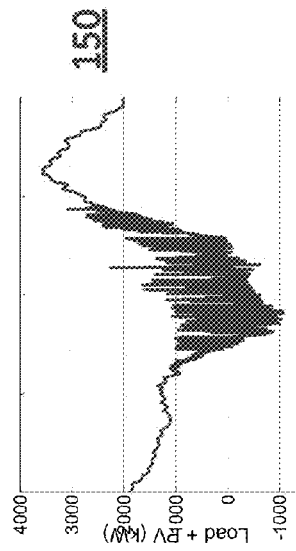
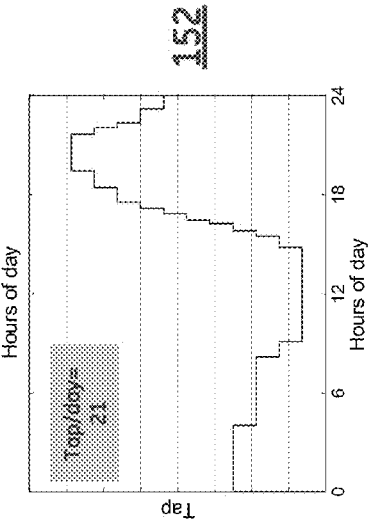
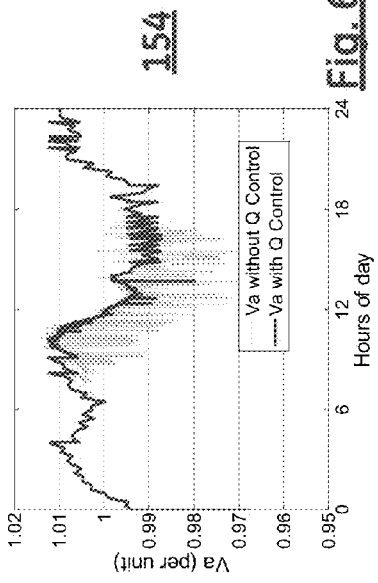
Fig. 6B

VOLTAGE REGULATION SYSTEM AND METHOD

BACKGROUND

Embodiments of the system relate generally to an integrated voltage/volt-ampere reactive (volt/var) control system and more specifically to a system and method for controlling a voltage profile in a power system.

The basic structure of an electric power system typically comprises various hardware elements such as generators, transformers, and real-time monitoring equipment, and software such as power flow analysis software, fault detection software, and restoration software for generation, transmission, and distribution of electricity.

With increased distributed generation, the integration of distributed generators into existing power systems presents technical challenges such as voltage regulation and increased duty cycle of operation of grid assets such as transformer taps and capacitor banks switches. Power quality is an essential customer-focused measure and is greatly affected by the operation of a distribution and transmission network.

Large inductive loads such as air conditioners, furnaces, dryers, and the like can consume reactive power (VARs) in addition to real power (Watts). Transferring reactive power over transmission lines and distribution feeders involves transferring additional current which results in power ($I^2R$) losses that have to be supplied by utilities. Since residential power meters typically only measure Watts that are used to determine customer billing requirements, utilities want to minimize the number of VARs consumed. This result is generally achieved by switching in capacitor banks to compensate for VAR losses locally in distribution systems.

In addition, power system operators ensure the quality of the power supplied to the customers by maintaining the load bus voltages within their permissible limits. Any changes to the system configuration or in power demands can result in higher or lower voltages in the system. With the increased penetration of Distributed Generation, such as Solar PV, the voltage excursions and associated variability increases on the local distribution networks. This results in excessive operation of transformer taps and capacitor bank switches, thereby reducing their operating life. Further, these are electro-mechanical equipment, which are not able to effectively chase the fast variability of distributed energy resources. On the other hand, distributed energy resources can act quickly to regulate their reactive power output and respond to the fast voltage variations.

For these and other reasons, there is a need for an improved integrated volt-var control system.

BRIEF DESCRIPTION

In accordance with an embodiment of the present technique, a method for regulating a power line voltage is provided. The method includes determining a slow voltage variation by filtering an actual voltage at terminals of the voltage regulation apparatus and determining a fast active power variation by filtering a measured active power of the DG system. A first frequency of the slow voltage variation is smaller than a second frequency of the fast active power variation. The method also includes controlling settings of the voltage regulation apparatus based on the slow voltage variation; and controlling a reactive power output of the DG system based on the fast active power variation.

In accordance with another embodiment of the present technique, an integrated volt-volt amp reactive (var) system is provided. The system includes a voltage deviation identification module to determine a slow power line voltage variation by filtering an actual voltage at output terminals of the voltage regulation apparatus. The system also includes an active power deviation identification module to determine a fast active power variation by filtering a measured active power of a distributed generation (DG) system; wherein a first frequency of the slow voltage variation is smaller than a second frequency of the fast active power variation. The system further includes a voltage regulation apparatus controller to control settings of the voltage regulation apparatus based on the slow power line voltage variation; and a distributed generation (DG) system controller to control a reactive power output of the DG system based on the fast active power variation.

DRAWINGS

These and other features, aspects, and advantages of the present invention will become better understood when the following detailed description is read with reference to the accompanying drawings in which like characters represent like parts throughout the drawings, wherein.

Figure 5:
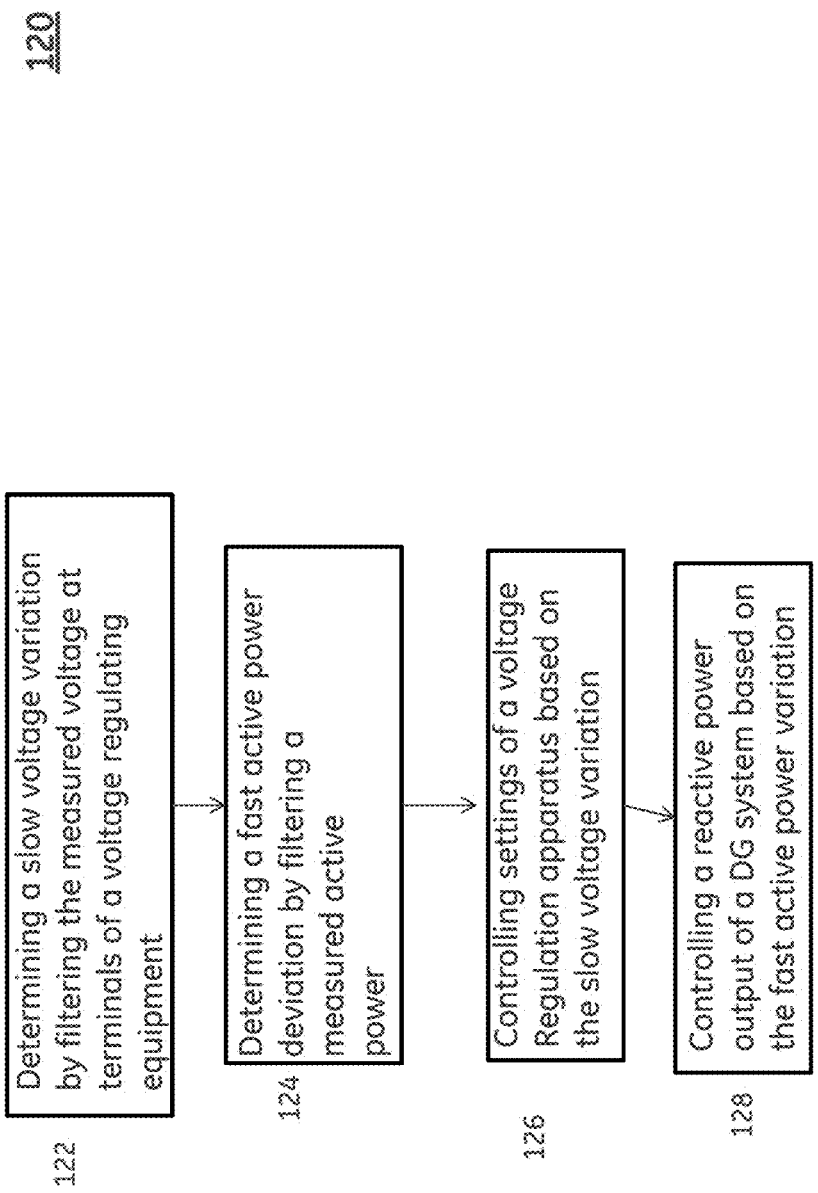

FIG. 5 is a flowchart representing a method for regulating a power line voltage in accordance with an embodiment of the present technique; and FIGS. 6A and 6B are graphical illustrations representing simulation plots of an active power, a number of taps for an OLTC and a line voltage for a conventional system and an integrated volt-var system in accordance with an embodiment of the present technique respectively.

DETAILED DESCRIPTION

As used herein, the terms "controller" or "module" refers to software, hardware, or firmware, or any combination of these, or any system, process, or functionality that performs or facilitates the processes described herein.

When introducing elements of various embodiments of the present system, the articles "a," "an," "the," and "said" are intended to mean that there are one or more of the elements. The terms "comprising," "including," and "having" are intended to be inclusive and mean that there may be additional elements other than the listed elements. Furthermore, the terms "connected" and "coupled" are used interchangeably and could mean direct or indirect connections unless noted.

Figure 1:
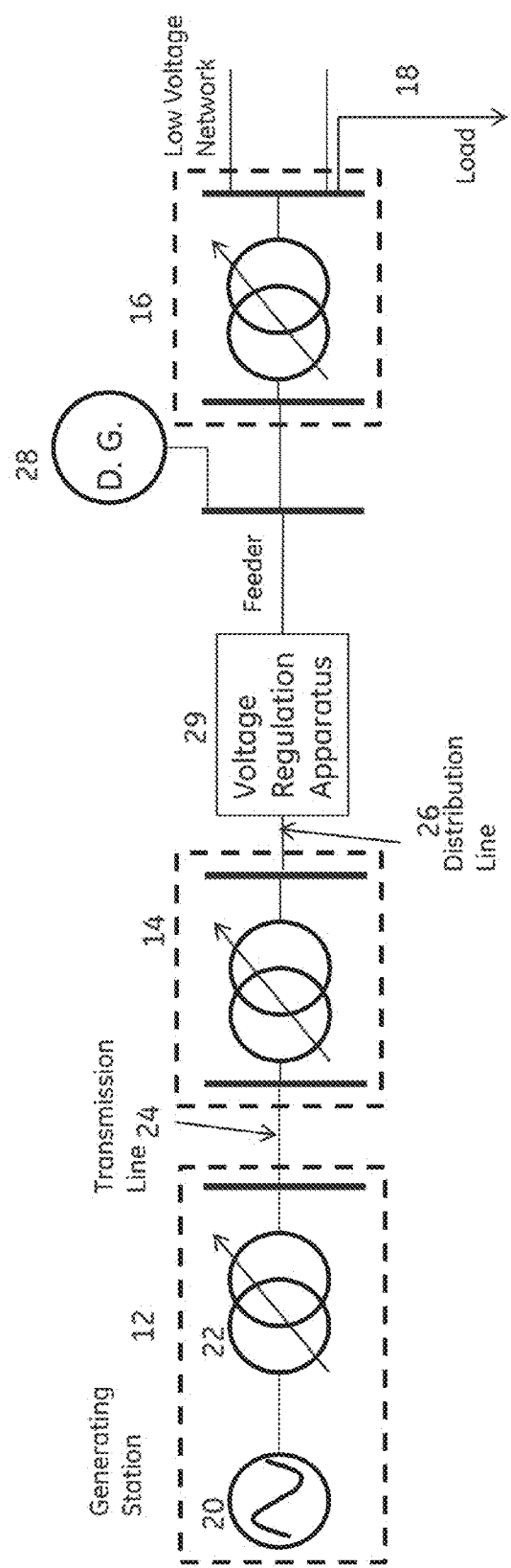
FIG. 1 is a single line diagram of an overall electric power system.

FIG. 1 illustrates a single line diagram of an overall electric power system 10 from generation to utilization. Electric power system 10 includes a generating station 12, a distribution substation 14, distribution transformer 16 and loads 18. Generating station 12 may comprise, for example, a hydropower generating station or a thermal power generating station. A generator 20 in generating station 12 generates electricity at a generating station voltage which in certain embodiments may range from 4 kV to 15 kV. The generating station voltage is stepped up to a higher transmission level voltage such as 345 kV in an embodiment by a generating station transformer 22 for more efficient transfer of the electricity.

The electricity is transmitted at the transmission level voltage to distribution substation 14 by primary transmission lines 24 that are configured to carry electricity over long distances. At distribution substation 14, a reduction in voltage level occurs for distribution to other points in the system through distribution lines 26. Further voltage reductions for commercial and industrial or residential loads 18 may occur at distribution transformer 16. In one embodiment, a distributed generation (DG) system 28 is connected to distribution line 26 and supplies power to power system 10. DG system 28 may include, for example, photovoltaic (PV) modules with a power converter (not shown). Distribution transformer 14 may supply electricity at voltages in the range of 4 kV to 69 kV, for example. The voltages may further be reduced by one or two more levels at local transformer 16 to supply the electricity to residential loads at lower voltages such as 120 V or 240 V.

Current and voltage ratings of transmission lines 24 determine a transmission capacity of transmission lines 24 which is generally measured in terms of mega volt-amp (MVA) loading (S). The MVA loading is a vector sum of an active power or a real power (P) and a reactive power (Q) and is given as P+jQ, where j is the imaginary unit. Thus, the reactive power Q which does not produce any work or energy puts a limit on the amount of active power P that can be transmitted though the transmission line 24. Furthermore, reactive power Q increases current in transmission line 24 and distribution line 26 resulting in voltage drop across these lines. Thus, the voltage seen at load points may be significantly lower if reactive power Q is higher. In one embodiment, a voltage regulation apparatus 29 such as on load tap changer (OLTC) or a voltage regulator or a capacitor bank is typically utilized for improving a grid voltage profile. The OLTC or the voltage regulator includes transformer taps and increase or decrease voltage at its output terminal in steps. Similarly, the capacitor bank varies the reactive power supplied to the grid in steps by varying a total number of capacitors (caps) connected to the grid and accordingly regulates the voltage.

In one embodiment, the OLTC has 32 taps, out of which 16 are for increasing the voltage (1 to 16 taps) whereas 16 are for decreasing the voltage (−1 to −16 taps). For example, if the output voltage is Vin with no taps employed or switched on, then tap 10 when switched on may yield output voltage of 1.0625 Vin and tap −10 will yield output voltage of 0.9375 Vin. It should be noted that the actual tap setting and tap will vary depending on the application. For example, for a distribution transformer the output voltage need not go as low as 0.9 Vin, but in certain conditions it may be necessary that the output voltage be higher than the input voltage. In another embodiment, the output voltage may need to be lower than 0.9 Vin.

In accordance with an embodiment of the present system and as discussed shown in subsequent figures, a grid voltage profile is improved by a coordinated control of voltage regulation apparatus 29 and the converter of DG system 28. In general, DG system 28 supplies a reactive power ΔQ locally which compensates for voltage variations due to fluctuations in an active power ΔP supplied by DG system 28 according to an equation given below $$\Delta V \approx -\frac{P}{V}R + \frac{Q}{V}X \quad (1)$$

where, ΔV is the voltage deviation caused by the Distributed Generator. ΔP is the change in the active power, and ΔQ is the change in the reactive power from the Distributed Generator; and R,X are line resistance and reactance respectively. The injection of reactive power ΔQ interacts with the line reactance and nullifies the voltage variation occurring from the interaction between active power variation and line resistance. According to this scheme, the Distributed Generator will only respond to fast ΔV variations. The voltage regulation apparatus 29 compensates for slow voltage variations arising only due to filtered net load downstream.

Figure 2:
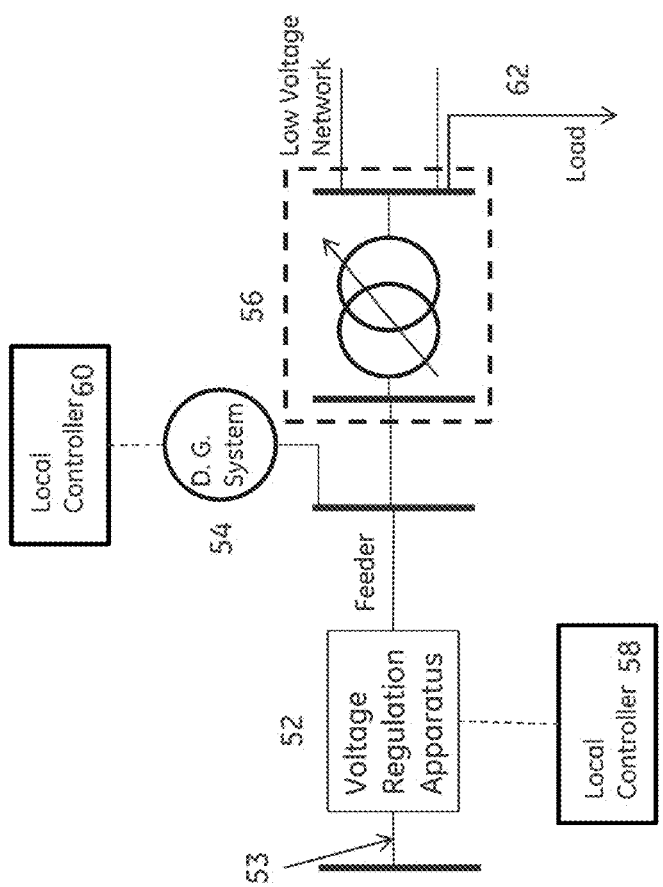
FIG. 2 is a schematic representation of an integrated volt/var system in accordance with an embodiment of the present technique.

FIG. 2 shows a schematic diagram of an integrated volt/var system 70 in accordance with an embodiment of the present technique. Integrated volt/var system 70 includes a voltage regulation apparatus 52 and a distributed generation (DG) system 54. It should be noted that the voltage regulation apparatus 52 and DG system 54 are three phase circuits in this example. Voltage regulation apparatus 52 receives power from a power line 53, adjusts its voltage and supplies it to load 62 through an optional distribution station 56. As discussed earlier, voltage regulation apparatus 52 may include an OLTC, a voltage regulator or a capacitor bank. Furthermore, voltage regulation apparatus 52 may be connected in series or in parallel with power line 53. For example, if voltage regulation apparatus 52 is a capacitor bank then it will be connected in parallel, whereas if voltage regulation apparatus 52 is an OLTC, then it will be connected in series with power line 53. It should be noted that the position of voltage regulation apparatus 52, distribution station 56 and DG system 54 is not limited to the locations shown in FIG. 2 but in other embodiments, their positions may be at different locations. For example, in one embodiment, DG system 54 may be located before voltage regulation apparatus 52. DG system 54 may include sources such as a wind turbine, a PV system, fuel cells or battery storage with a power converter (not shown). Furthermore, for simplicity only one voltage regulation apparatus 52 and only one DG system 54 is shown. However, in other embodiments, there may be a plurality of voltage regulation apparatuses and DG systems.

A first local controller 58 controls the operation of voltage regulation apparatus 52 and a second local controller 60 controls the operation of DG system 54. The operation of each of the local controllers 58 and 60 will be described herein. In general, the variation in power line voltage depends on at least two parameters. One parameter is a power line loading (i.e., how much load the power line is drawing) and second parameter is a power generation by the DG or other system. Since the changes in power line loading are slow, it results in slower variations in the power line voltage. However, since the power generation by DG system depends on various factors which can vary significantly throughout the day, it results in faster variations in the power line voltage. For example, for a PV system the power generation depends on whether it's a clear day, a sunny day or a cloudy day. Wind generation is also impacted by the environmental conditions. In one embodiment, voltage regulation apparatus 52 controls slow variations in the power line voltage by changing its settings (e.g., taps for an OLTC and caps for a capacitor bank) and DG system 54 compensates for fast power line voltage variations due to variation in generated active power by injecting an appropriate amount of reactive power into the grid. Slower variations have slower frequency compared to faster variations.

In the embodiment 70 of FIG. 2, the filtered voltage at the local regulator terminal determines the tap/cap movement. When this value goes outside a pre-defined threshold, the regulator makes necessary movements to bring it within the threshold. In one embodiment, the threshold is reconfigurable based on the system conditions. Thus, in one embodiment, the threshold may have steps of 0.625%. Similarly, the active power variation for DG system 54 may also be determined locally by filtering the actual power. In this embodiment, the active power variation may be determined by high pass filtering the actual power of DG system 54 or by subtracting a low pass filtered actual active power from the actual active power.

Figure 3:
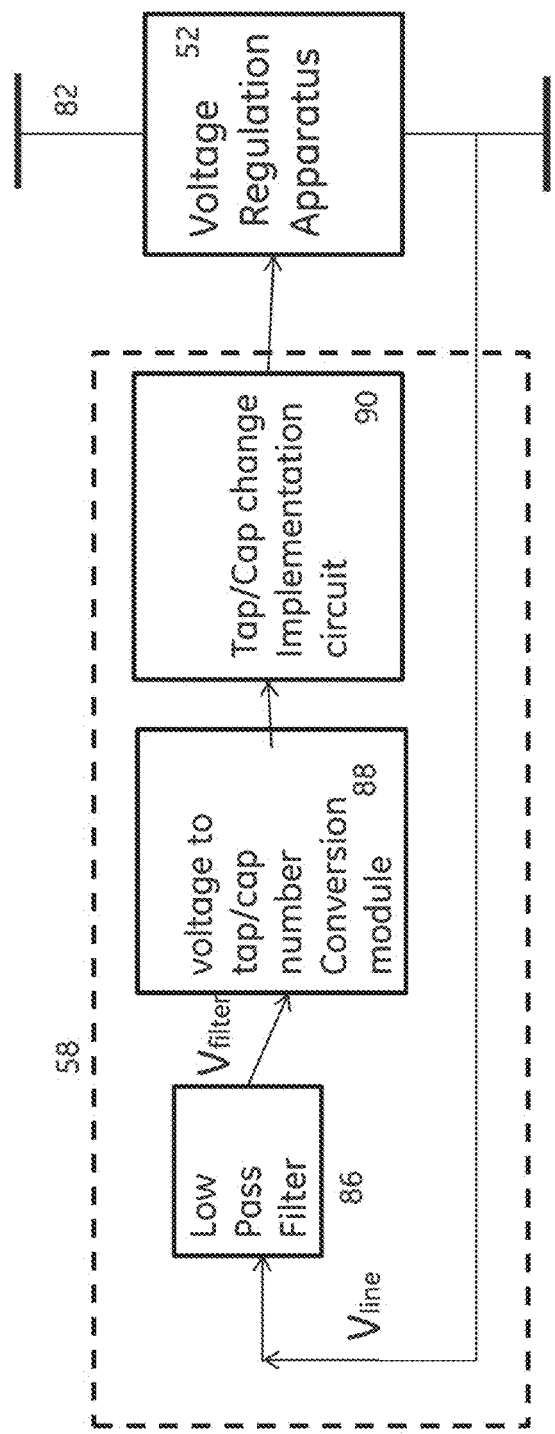
FIG. 3 is a detailed schematic representation of a voltage regulation apparatus and its local controller of FIG. 2 in accordance with an embodiment of the present technique.

FIG. 3 is a detailed schematic 80 of voltage regulation apparatus 52 and its local controller 58 of FIG. 2. Voltage regulation apparatus 52 may be an OLTC or a voltage regulator with transformer taps or a capacitor bank with a provision to vary a total number of capacitors connected to power line 82. As discussed earlier, when voltage regulation apparatus 52 is an OLTC it is connected in series with power line 82 and when voltage regulation apparatus 52 is a capacitor bank it is connected in parallel with power line 82. In one embodiment, power line 82 is a three phase line and voltage regulation apparatus 52 is a three phase apparatus. Thus, voltage regulation apparatus 52 regulates voltage of each phase of power line 82.

Local controller 58 controls voltage regulation apparatus 52 and includes a low pass filter block 86 to determine a filtered voltage ($V_{filter}$). This voltage is compared against a threshold (positive or negative) to determine the control action. It should be noted that for a three phase embodiment, there will be three phase filtered voltages (i.e., $V_{filter}$ actually refers to $V_{filtera}$, $V_{filterb}$ and $V_{filterc}$) and three phase line voltages (i.e., $V_{line}$ refers to $V_{linea}$, $V_{lineb}$ and $V_{linec}$). The value of filtered voltage $V_{filter}$ at every time step is determined based on the instantaneous and past measured voltage for a given time period. The line voltage $V_{line}$ ($V_{linea}$, $V_{lineb}$ and $V_{linec}$ in three phase terms) is then fed to a low pass filter 86. The low pass filter block 86 provides the filtered signal $V_{filter}$ to a voltage to tap/cap number conversion module 88. In one embodiment, low pass filter rejects high frequency content in the measured line voltage and allows the low frequency content to pass through it. In another embodiment, a time constant for the low pass filter may be determined based on a first frequency of slow voltage variations which is generally smaller than a second frequency of fast voltage or active power variations.

Voltage to tap/cap number conversion module 88 converts the received filtered voltage $V_{filter}$ into appropriate number of tap positions for the OLTC or appropriate number of capacitors for the capacitor bank that need to be switched on to regulate the voltage and transmits the information to tap/cap change implementation circuit 90. Tap/cap change implementation circuit 90 then changes the number of capacitors or number of taps in voltage regulation apparatus 52. For example, if the threshold voltage value is 0.98 pu and if the filtered value at a particular time period is 0.9675 pu then to achieve 0.98 pu, two of the taps may be switched ON assuming 0.00625 pu volts/tap Similarly, if the voltage is 0.88 pu then 16 taps may need to be switched ON. Similarly, connecting or disconnecting a number of capacitors from the capacitor bank to the power lines changes the power line voltage the grid voltage.

Figure 4:
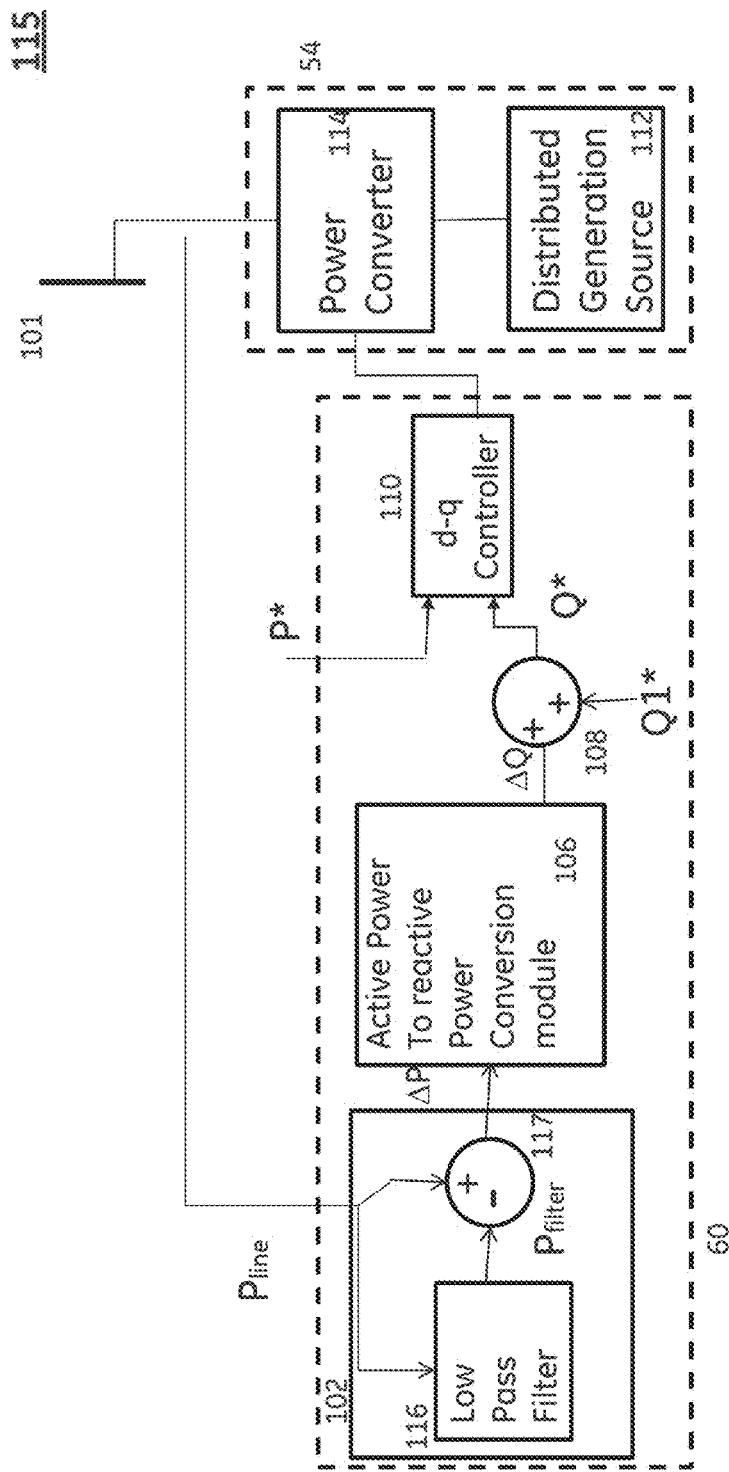
FIG. 4 is a detailed schematic representation of a distributed generation system and its local controller of FIG. 2 in accordance with an embodiment of the present technique.

FIG. 4 is a detailed schematic 100 of DG system 54 and its local controller 60 of FIG. 2. DG system 54 is connected to a power grid bus 101 and includes a distributed generation source 112 such as a wind turbine, a PV module, a fuel cell or a battery storage and a power converter 114. In one embodiment, power grid bus 101 is a three phase bus and DG system 54 is also a three phase DG system. Thus, DG system 54 injects current in each phase of power grid bus 101 and regulates voltage of each phase of power grid bus 101.

Local controller 60 controls power converter 114 and includes an active power deviation identification block 102 to determine the active power deviation $\Delta P$. The active power deviation $\Delta P$ ($\Delta P_a$, $\Delta P_b$ and $\Delta P_c$ in three phase terms) is then fed to an active power to reactive power conversion module 106. In active power deviation identification block 102 the actual active power $P_{line}$ is passed through a low pass filter 116. The low pass filter 116 provides the filtered active power $P_{filter}$ to a difference block 117 which determines an active power deviation signal $\Delta P$ based on a difference between actual active power $P_{line}$ and the filtered active power $P_{filter}$. A time constant for the low pass filter is determined based on a frequency of slow voltage variations and as discussed earlier the frequency of slow voltage variations is smaller than a frequency of fast active power variations of the DG system. In yet another embodiment, the low pass filter 116 can be a moving average filter. In one embodiment, the time constant for the low pass filter 86 of FIG. 4 and the time constant for the low pass filter 116 of FIG. 6 may be kept same. In another embodiment, the active power deviation identification block 102 may be replaced by a high pass filter (not shown) which receives only filters out high frequency component from actual active power $P_{line}$ which is nothing but active power deviation signal $\Delta P$ and feeds it to active power to reactive power conversion module 106.

In embodiment 115, a relationship between three phase line voltages Va, Vb and Vc which form line voltage $V_{line}$ and three phase active powers (Pa, Pb, Pc) and reactive powers (Qa, Qb, Qc) supplied by the DG system may be given as:

$$\begin{bmatrix} \Delta Va \\ \Delta Vb \\ \Delta Vc \end{bmatrix} = \begin{bmatrix} \frac{\partial Va}{\partial Pa} & \frac{\partial Va}{\partial Pb} & \frac{\partial Va}{\partial Pc} \\ \frac{\partial Vb}{\partial Pa} & \frac{\partial Vb}{\partial Pb} & \frac{\partial Vb}{\partial Pc} \\ \frac{\partial Vc}{\partial Pa} & \frac{\partial Vc}{\partial Pb} & \frac{\partial Vc}{\partial Pc} \end{bmatrix} \quad (2)$$

$$\begin{bmatrix} \Delta Pa \\ \Delta Pb \\ \Delta Pc \end{bmatrix} + \begin{bmatrix} \frac{\partial Va}{\partial Qa} & \frac{\partial Va}{\partial Qb} & \frac{\partial Va}{\partial Qc} \\ \frac{\partial Vb}{\partial Qa} & \frac{\partial Vb}{\partial Qb} & \frac{\partial Vb}{\partial Qc} \\ \frac{\partial Vc}{\partial Qa} & \frac{\partial Vc}{\partial Qb} & \frac{\partial Vc}{\partial Qc} \end{bmatrix} \begin{bmatrix} \Delta Qa \\ \Delta Qb \\ \Delta Qc \end{bmatrix}$$

Equation (1) represents the line voltage deviation ($\Delta Va$, $\Delta Vb$, $\Delta Vc$) in terms of deviations in active power $\Delta P$ (i.e., $\Delta Pa$, $\Delta Pb$, $\Delta Pc$) and reactive power $\Delta Q$ (i.e., $\Delta Qa$, $\Delta Qb$, $\Delta Qc$). As can be seen from equation (1), changes in active or reactive power in one phase (e.g., $\Delta Pa$ or $\Delta Qa$) affects voltages in all three phases (i.e., Va, Vb and Vc). The terms $\partial V/\partial P$ and $\partial V/\partial Q$ are sensitivity factors or elements between the said voltage and the said active or reactive power. The sensitivity factors may be defined as an amount by which voltage varies with a unit change in active or reactive power. The sensitivity factors in one example are constants for a given network condition and network loading and are determined based on an off-line study. In one embodiment, the off-line study includes simulating a power system, determining a plurality of relationships between changes in all phase voltages with respect to a linear change in active or reactive power injection of one phase and then based on the plurality of relationships determining sensitivity factors $\partial V/\partial P$ and $\partial V/\partial Q$. In one embodiment, determining a plurality of relationships comprises plotting a plurality of plots of changes in all phase voltages with respect to a linear change in active or reactive power injection of one phase and then determining plot slops.

Generally the fast variations in the power line voltage occur due to fluctuations in DG system active power P. Thus, if the voltage deviation $\Delta V$ occurring due to active power deviation $\Delta P$ is to be nullified then an appropriate amount of reactive power deviation needs to be injected in the power line. Equation (2) then may be simplified to the below equation which can be utilized by active power to reactive power conversion module 106.

$$\begin{bmatrix} \Delta Qa \\ \Delta Qb \\ \Delta Qc \end{bmatrix} = - \begin{bmatrix} \frac{\partial Va}{\partial Qa} & \frac{\partial Va}{\partial Qb} & \frac{\partial Va}{\partial Qc} \\ \frac{\partial Vb}{\partial Qa} & \frac{\partial Vb}{\partial Qb} & \frac{\partial Vb}{\partial Qc} \\ \frac{\partial Vc}{\partial Qa} & \frac{\partial Vc}{\partial Qb} & \frac{\partial Vc}{\partial Qc} \end{bmatrix}^{-1} \begin{bmatrix} \frac{\partial Va}{\partial Pa} & \frac{\partial Va}{\partial Pb} & \frac{\partial Va}{\partial Pc} \\ \frac{\partial Vb}{\partial Pa} & \frac{\partial Vb}{\partial Pb} & \frac{\partial Vb}{\partial Pc} \\ \frac{\partial Vc}{\partial Pa} & \frac{\partial Vc}{\partial Pb} & \frac{\partial Vc}{\partial Pc} \end{bmatrix} \begin{bmatrix} \Delta Pa \\ \Delta Pb \\ \Delta Pc \end{bmatrix} \quad (3)$$

As discussed above, the sensitivity factors $\partial V/\partial P$ and $\partial V/\partial Q$ are constants, thus, the above equation may be reduced to $$\begin{bmatrix} \Delta Qa \\ \Delta Qb \\ \Delta Qc \end{bmatrix} = - \begin{bmatrix} K_{aa} & K_{ab} & K_{ac} \\ K_{ba} & K_{bb} & K_{bc} \\ K_{ca} & K_{cb} & K_{cc} \end{bmatrix} \begin{bmatrix} \Delta Pa \\ \Delta Pb \\ \Delta Pc \end{bmatrix} \quad (4)$$

In one embodiment, for a standard 13 bus IEEE system, a sensitivity matrix (3×3 matrix) in equation (4) above may be given as $$\begin{bmatrix} K_{aa} & K_{ab} & K_{ac} \\ K_{ba} & K_{bb} & K_{bc} \\ K_{ca} & K_{cb} & K_{cc} \end{bmatrix} = \begin{bmatrix} 0.2468 & 0.4724 & -0.3188 \\ -0.401 & 0.2992 & 0.3686 \\ 0.3629 & -0.203 & 0.2588 \end{bmatrix} \quad (5)$$

As discussed above, the sensitivity factors $\partial V/\partial P$ and $\partial V/\partial Q$ in the sensitivity matrix are determined based on an off-line study. These sensitivity factors depend on network parameters and a line loading. The network here refers to a power system network for which the voltage regulation is under consideration. The network includes a number of buses, feeders, voltage regulators, and DGs. The network parameters include resistance (R) and reactance (X) of various power lines in the network. If the network changes (e.g., disconnection of a feeder due to fault) then the sensitivity matrix also changes accordingly. Thus, every time there is a change in network, the sensitivity matrix needs to be recalculated. Furthermore, even if the line loading changes, the sensitivity matrix needs to be recalculated. For example, there may be two different sensitivity matrices for two different types of loading conditions, peak load, and off-peak load. Thus, in an embodiment, these two thresholds may be utilized to change the sensitivity matrix. This is so because the various types of loading level affects the line loading. In one embodiment, a lookup table may be utilized to determine various sensitivity matrices based on various power line loadings.

Local controller 60 utilizes a summation block 108 to add the reactive power deviation ΔQ determined from above equation (3) or (4) to a primary reactive power signal Q1*. Output signal of summation block 108 then forms reference reactive power signals Q* and along with a reference active power signal P* is provided to a d-q controller 110. Reference active and primary reactive power signals P* and Q1* are provided by a system operator or an additional controller (e.g., a maximum power point tracking controller for a PV system). In one embodiment, d-q controller 110 provides pulse width modulation (PWM) signals to power converter 114 based on reference active and reactive power signals P* and Q*. In one embodiment, d-q controller 110 first converts active and reactive power signals P* and Q* into d-q domain voltage signals Vd* and Vq* and then converts voltage signals Vd* and Vq* into three phase voltage signals Va*, Vb* and Vc*. It should be noted that, the local controller 60 may include other components such as an analog to digital conversion (ADC) or a digital to analog conversion (DAC) which are not shown in FIG. 4.

FIG. 5 shows a flowchart 120 representing a method of regulating a power line voltage in accordance with an embodiment of the present technique. At step 122, the method includes determining a slow voltage variation ΔV by filtering the measured voltage at the terminal of a voltage regulating equipment. In one embodiment, filtering the measured voltage includes utilizing a low pass filtering. The time constant of the low pass filter may be determined based on a first frequency of slow voltage variations which is smaller than a second frequency of fast voltage or active power variations of the DG system. Furthermore, in step 124, a fast active power variation ΔP is determined either by high pass filtering a measured active power of the DG system. In one embodiment, the time constant for high pass filtering is determined based on frequency of fast active power variations which is generally higher than the frequency of slow voltage variations. In step 126, settings of the voltage regulation apparatus are controlled based on the slow voltage variations. Controlling settings of the voltage regulation apparatus includes utilizing a pre-defined threshold and whenever the slow voltage variation goes outside the pre-defined threshold, making necessary control actions to bring it within the threshold. In step 128, a reactive power output of the DG system is controlled based on the fast active power variation and thus, the power line voltage profile is regulated.

FIG. 6A shows three simulation plots 140, 142 and 144 representing active power P, number of taps for an OLTC and a line voltage V respectively for a conventional system. FIG. 6B shows three simulation plots 150, 152 and 154 representing active power P, number of taps for the OLTC and the line voltage V respectively for an integrated volt-var system in accordance with an embodiment of the present technique. As can be seen from plots, from 8 to 18 hours of the day there is a lot of variation in active power P. For FIG. 6A even though the OLTC operates its taps (plot 142) to regulate the line voltage (plot 144), the line voltage still has a lot of variation. This is because the taps control the line voltage only in steps. At the same time, the taps are changing rapidly during this time. Thus, total tap changes throughout the day are 67. This number is significantly higher and results in more maintenance requirement for the OLTC. Whereas, for FIG. 6B the OLTC operates in coordination with the DG system control. Thus, the line voltage (plot 154) is smoother compared to the line voltage of FIG. 6A. Furthermore, the total number of tap also reduces to 21 per day. This is significantly lower number and reduces higher maintenance requirement for the OLTC and results in extended life.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for regulating a power line voltage, comprising:
   determining a slow voltage variation by filtering an actual voltage at terminals of the voltage regulation apparatus;
   determining a fast active power variation by filtering a measured active power of the DG system; wherein a first frequency of the slow voltage variation is smaller than a second frequency of the fast active power variation; controlling settings of the voltage regulation apparatus based on the slow voltage variation; and controlling a reactive power output of the distributed generation (DG) system based on the fast active power variation.

2. The method of claim 1, wherein the voltage regulation apparatus comprises a voltage regulator, an on load tap changer (OLTC) or a capacitor bank.

3. The method of claim 2, wherein controlling settings of the voltage regulation apparatus comprises converting the slow voltage variation into a number of taps of the OLTC or a number of capacitors of the capacitor bank that need to be switched on to regulate the power line voltage.

4. The method of claim 1, wherein the DG system comprises a wind turbine, fuel cells, battery storage or photovoltaic (PV) system with a power converter.

5. The method of claim 1, wherein controlling the reactive power output of the DG system comprises providing a reference reactive power comprising a summation of the reactive power deviation and a primary reactive power.

6. The method of claim 1, wherein controlling settings of the voltage regulation apparatus comprises utilizing a predefined threshold.

7. The method of claim 1, wherein filtering the measured active power of the DG system comprises utilizing a high pass filtering or subtracting a low pass filtered measured active power from the measured active power.

8. The method of claim 1, wherein controlling the reactive power output of the DG system comprises determining a relationship between a reactive power deviation and the active power deviation.

9. The method of claim 8, wherein the relationship between the reactive power deviation and the active power deviation is based on a sensitivity matrix, wherein elements of the sensitivity matrix are determined based on sensitivity elements between a voltage and a power.

10. The method of claim 9, wherein the sensitivity elements are determined based on an off-line study.

11. The method of claim 10, wherein the off-line study includes simulating a power system, determining a plurality of relationships between changes in phase voltages with respect to a linear change in the power injection of one phase and determining sensitivity factors based on the plurality of relationships.

12. The method of claim 10, wherein the sensitivity elements are based on network parameters and a power line loading.

13. The method of claim 12, wherein the network parameters include resistance and reactance of a plurality of power lines in the network.

14. The method of claim 10, wherein the sensitivity matrix is updated whenever there is change in the network or the power line loading.

15. An integrated volt-volt amp reactive (var) system, comprising:
a voltage deviation identification module to determine a slow power line voltage variation by filtering an actual voltage at output terminals of the voltage regulation apparatus;
an active power deviation identification module to determine a fast active power variation by filtering a measured active power of a distributed generation (DG) system; wherein a first frequency of the slow voltage variation is smaller than a second frequency of the fast active power variation;
a voltage regulation apparatus controller to control settings of the voltage regulation apparatus based on the slow power line voltage variation; and
a distributed generation (DG) system controller to control a reactive power output of the DG system based on the fast active power variation.

16. The integrated volt-var system of claim 15, wherein the voltage regulation apparatus comprises a voltage regulator, an on load tap changer (OLTC) or a capacitor bank.

17. The integrated volt-var system of claim 16, wherein the voltage regulation apparatus controller comprises a voltage to tap/cap number conversion module to convert the slow power line voltage deviation into a number of taps of the OLTC or a number of capacitors of the capacitor bank that need to be switched on to regulate the power line voltage based on a threshold voltage.

18. The integrated volt-var system of claim 15, wherein the DG system comprises a wind turbine, fuel cells, battery storage or a photovoltaic (PV) system with a power converter.

19. The integrated volt-var system of claim 15, wherein the relationship between active power deviation and the reactive power deviation includes a sensitivity matrix determined based on sensitivity elements between a voltage and a power.

20. The integrated volt-var system of claim 15, wherein the active power deviation identification module comprises a high pass filter to filter the measured active power of the DG system.

21. The integrated volt-var system of claim 15, wherein the voltage deviation identification module comprise a low pass filter to filter the actual voltage at terminals of the voltage regulation apparatus.

* * * * *